United States Patent [19]

Morris et al.

[11] Patent Number: 5,740,987
[45] Date of Patent: Apr. 21, 1998

[54] HELICOPTER CYCLIC CONTROL ASSEMBLY

[76] Inventors: Joseph J. Morris, P.O. Box 13158, South Lake Tahoe, Calif. 96151; Gerard G. Grass, 7770 Yager Rd., North Bay, N.Y. 13123

[21] Appl. No.: 565,825
[22] Filed: Dec. 1, 1995
[51] Int. Cl.[6] .................................................. B64C 27/52
[52] U.S. Cl. .......................... 244/17.25; 244/17.27; 244/17.11
[58] Field of Search ........................... 244/17.25, 17.27; 416/147, 148, 149; 74/490.06, 479.01; 248/371, 396, 133, 137

[56] References Cited

U.S. PATENT DOCUMENTS

| | | | |
|---|---|---|---|
| 3,118,504 | 1/1964 | Cresap | 244/17.27 |
| 3,611,367 | 10/1971 | Billottet | 244/17.25 |
| 3,921,939 | 11/1975 | Garfinkle | 244/17.25 |
| 4,053,123 | 10/1977 | Chadwick | 244/17.25 |
| 4,430,045 | 2/1984 | Cresap | 244/17.27 |

Primary Examiner—Lesley D. Morris
Assistant Examiner—Tien Dinh
Attorney, Agent, or Firm—Kevin Ellicott, Esq.

[57] ABSTRACT

A helicopter cyclic control assembly for redirecting the thrust produced at a main rotor assembly includes a rotor disc control plate having arms with arm tubes therein for close, slideable insertion of slide rods, the slide rods being pivotally attached to bi-directional linear actuators, the bi-directional linear actuators being attached to the helicopter transmission casing or main truss works. The rotor disc control plate also having a neck tube with a bore which passes through the rotor disc control plate, through which an upper shaft passes and is rotatably engaged, the neck tube being perpendicular to the arm tubes. The upper shaft being fixedly attached at a distal end to the main rotor assembly, and rotatably engaged at a proximal end to a constant velocity joint such that as the motor is rotatably driving the upper shaft, the rotor disc control plate may be tilted relative to the helicopter body, the upper shaft tilting in cooperation with the rotor disc control plate, thereby changing the horizontal plane of the main rotor assembly, and redirecting the thrust produced at the main rotor assembly.

3 Claims, 5 Drawing Sheets

HELICOPTER CYCLIC CONTROL ASSEMBLY

FEDERALLY SPONSORED RESEARCH AND DEVELOPMENT

There are no federally sponsored or funded research or development projects or undertakings in any way associated with the instant invention.

TITLE

Your inventors, Gerard G. Grass, 7770 Yager Road, North Bay, N.Y. and Joseph J. Morris, 969 Brockway Avenue, Apartment 11, South Lake Tahoe, Calif., hereby respectfully submit this, their application for Letters Patent as respect their invention entitled "A Helicopter Cyclic Control Assembly".

CROSS REFERENCE TO RELATED APPLICATIONS

The present application is a substitute for a prior application which was rejected as incomplete. No filing date was accorded the prior application, and said application was destroyed with permission of the inventors, in accordance with Patent and Trademark Office procedure.

BACKGROUND OF THE INVENTION

1. Field of the invention

The instant invention relates to that field of devices consisting of Assemblies used to control cyclic trim and provide directional thrust in helicopters.

2. Informational Statement Regarding Possible Prior Art

The rotor control system for a helicopter includes a helicopter rotor blade assembly (hub) on which blades, which are capable of producing aerodynamic lift or thrust, are rotatably mounted. The angle of attack of the aerodynamic surface of the blades with respect to the airstream is changed by rotating the blades with respect to a reference pitch axis through control input forces applied by pitch links attached to the blades eccentric of the pitch axis. The opposite end of the pitch links are connected to a rotating ring or swashplate driveably connected to a main rotor blade shaft. The shaft is driven though sets of meshing gears contained in a casing of a transmission which reduces the speed of the main rotor blade shaft in relation to the speed of an engine connected to the transmission input.

Changing the lift or thrust produced by the main rotor blade is accomplished by changing the pitch of each blade equally, at the same time via the pitch links. This is called collective control. This same method is used in order to make fine adjustments known as feathering. Directional thrust is accomplished by changing the pitch of each blade differentially as it they rotate. This is called cyclic control.

Prior art cyclic control systems rely upon a stationary ring surrounding the main rotor blade shaft, which ring may be raised, lowered or tilted by action of control servos or actuators. A rotating ring is attached to the stationary ring through bearings which allow relative rotation between the rings and maintain elevation and tilt of the rotating ring and rotor identical with those of the stationary ring. The rotating ring carries pitch links extending to each blade so that elevation and tilt of the tings effects pitch changes at the blades. Elevation of the stationary ring and rotating ring axially along the rotor shaft and tilting of these rings angularly with respect to the rotor shaft are produced by hydraulic actuators or servos, a longitudinal servo and multiple lateral servos, connected to the stationary ring at positions spaced angularly about the axis of the rotor shaft In the conventional prior art, the stationary ring includes a fourth attachment where a stationary scissors assembly is connected to the ring and to the upper surface of the transmission casing. This scissors permits the stationary ring to raise, lower and tilt according to the effect of the control servos, but the scissors prevents rotation of the ring.

A BRIEF DESCRIPTION OF THE DRAWINGS

1. A Summary of the invention

The instant invention is a helicopter cyclic control assembly. The primary functions of the invention are to more effectively direct the thrust produced by the rotation of main helicopter rotor blades, to reduce the number of moving parts which are currently utilized to redirect thrust, and to decrease the stresses created by the currently utilized cyclic control systems. To those ends, a first vertical axis is defined by a vertical, longitudinal axis of a shaft. A first horizontal plane is defined by a line running through a point at the nose of the helicopter and a point at the tail of the helicopter, and a line running through a point at the port side of the helicopter and a point on the starboard side. Redirection of thrust, known as cyclic control, is accomplished in the instant invention by creating an acute angle in the first vertical axis, relative to the horizontal plane. The change in the first vertical axis is accomplished by tilting a rotor disc control plate through which an upper shaft passes, the upper shaft having a diameter sized to permit its free rotation within the rotor disc control plate. The upper shaft is fixedly attached at a distal end to the helicopter main rotor blade assembly and engaged at a proximal end with a means for transferring the rotational force (provided by a motor and transmission), to the helicopter main rotor blade assembly. The rotor disc control plate is also the primary structural attachment for the upper shaft to the helicopter body. The rotor disc control plate has arms in which slide rods are slidably located. These slide rods are pivotally attached to a means for pushing and pulling, the slide rods and means for pushing and pulling working in concert to permit the tilting of the rotor disc control plate relative to the first horizontal plane. The means for pushing and pulling are fastened to the helicopter transmission casing, and constitute the primary structural attachment point between the cyclic control assembly and the helicopter body.

The instant invention requires a collective trim control assembly and feathering capability, as do the current cyclic adjustment assemblies. The collective trim assembly is attached to a swashplate, and the swashplate is attached to the upper surface of the rotor disc control plate via means for pushing and pulling. Precise cooperation between, and independent functioning of, the collective control and cyclic control is accomplished with the assistance of a digital information processor such as a computer.

The instant invention may be installed in helicopters having rigid rotor assemblies, semi-articulated rotor assemblies, or fully articulated rotor assemblies. However, utilization with a rigid rotor assembly requires the fewest alterations in the collective assembly.

2. Objects of the Invention

The modern helicopter relies upon the same basic engineering principals which were relied upon by Sikorsky when he first invented the helicopter. However, since Sikorsky's time, the materials and engineering methods available have changed dramatically. Unfortunately, many of the engineering principals used to design the cyclic control assembly have not been critically reexamined with an eye toward improving the basic configuration.

A primary objective of the instant invention is to more effectively exert cyclic control. The instant invention constitutes a radical departure from current cyclic control systems by utilizing an upper shaft which is not in direct contact with the engine or transmission, and by tilting a rotor disc control plate to vary the vertical axis of this upper shaft relative to a horizontal plane defined by the helicopter body. The ability to modify the vertical axis of the upper shaft in relation to the helicopter body results in a far more stable system which allows greater speeds, more direct maneuvering responses, significant reduction of the vibrations caused by existing cyclic control systems, and less distortion.

Another objective of the instant invention is to reduce the number of moving parts required in order to exert cyclic control, and in so doing decrease system stress. Cyclic control is currently accomplished by relying upon differential trimming of the main helicopter rotor blades through a complex assembly utilizing rods, hinge points, levers and swash plates. This practice has created substantial engineering problems such as lead/lag, vibration, and blade flapping, to name a few, which have in turn required the addition of many complex compensation systems such as blade hinges, vibration dampeners and lead-lag motion dampeners. A more complete understanding of the current cyclic control assemblies may be had in *Helicopter Maintenance*, by Joe Schafer, International Standard Book Number 0-89100-281-2, published by IAP Inc., Copyright 1980. These additional systems necessitate a plethora of moving parts, and extensive down time for their servicing and maintenance. Reduction in the number of moving parts also results in a lengthening of the useful life span of the remaining system parts.

The instant invention may be installed in nearly any current helicopter, and by so installing render unnecessary many of the complex compensation systems and their constituent parts including the ball joint assembly for operating the stationary and rotating rings, scissors assemblies, levers, and joints. This will result in tremendous time and cost savings in terms of service, maintenance, and down time. Furthermore, use of the instant invention will produce increased power and thrust in most helicopters. The United States Military could refit this system into their current Apache Attack Helicopter and realize top speeds of approximately 30% greater than their current top speeds, making them faster than the current speed leader, the Russian Hind. In addition, the Department of Defense would experience cost savings for service and maintenance of at least approximately $1.5 Billion on its helicopter fleet, per year.

Finally, the instant invention makes possible the construction of more inexpensive and maneuverable drone helicopters capable of performing remote, unmanned reconnaissance for groups such as the United States Military.

A DESCRIPTION OF THE DRAWINGS

The invention will be better understood with the aid of a particular illustrative embodiment described below by way of non-limiting example with reference to the attached drawings in which.

A DESCRIPTION OF THE PREFERRED EMBODIMENT

Figure 1:
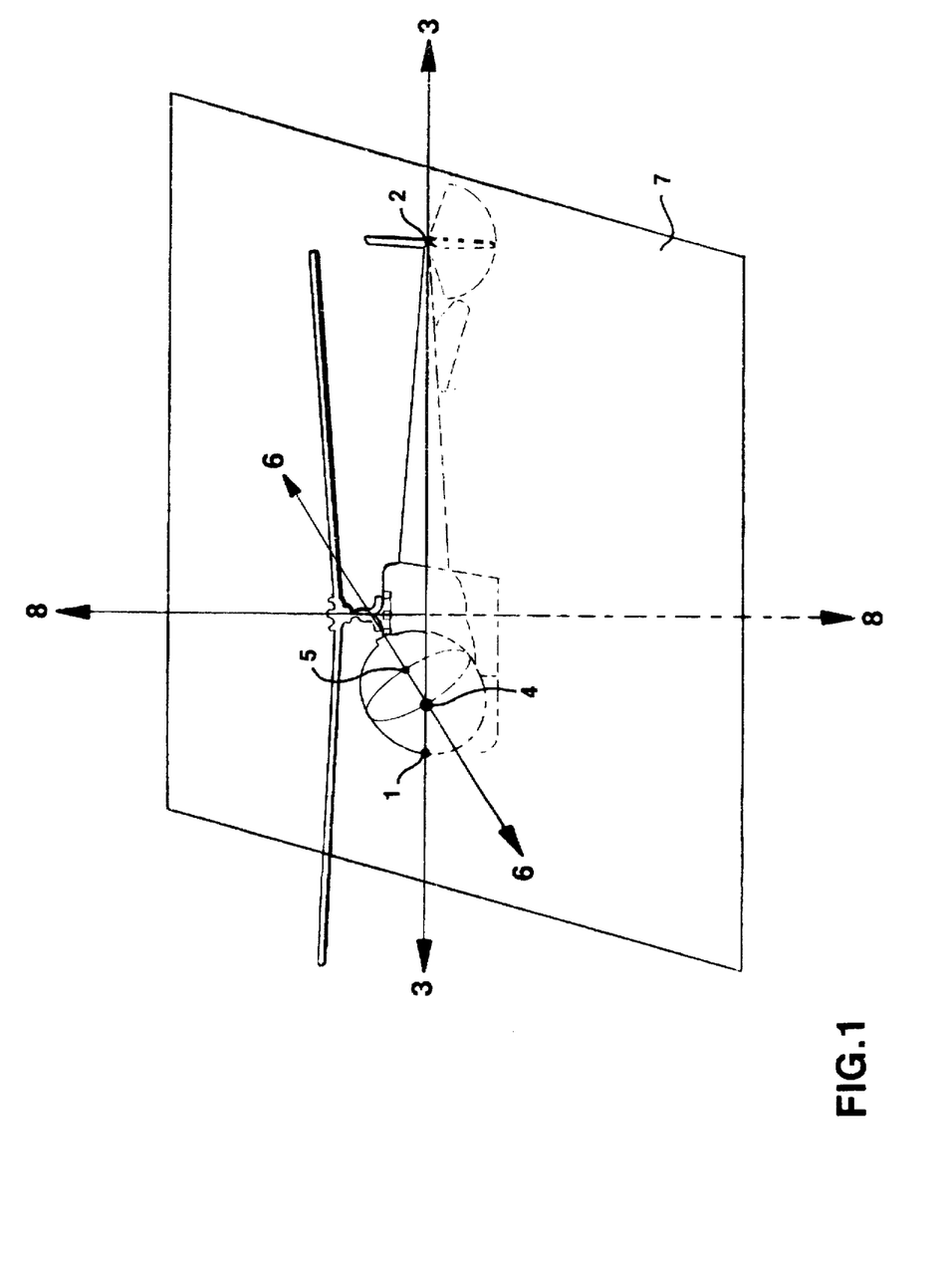
FIG. 1 is a perspective view of the helicopter showing the first vertical axis, and the horizontal plane.

As per FIG. 1, a first point 1 is located at the front of a helicopter and a second point 2 is located at the rear of the helicopter. A first horizontal axis 3 is defined by a line drawn through the first point 1 and the second point 2. A third point 4 is located on the port side of the helicopter and a fourth point 5 is located on the starboard side. A second horizontal axis 6 is defined by a line drawn through the third point 4 and the fourth point 5. A first horizontal plane 7 is defined by the first horizontal axis 3 and the second horizontal axis 6. A first vertical axis 8 is defined as being perpendicular to the first horizontal plane 7.

Figure 2:
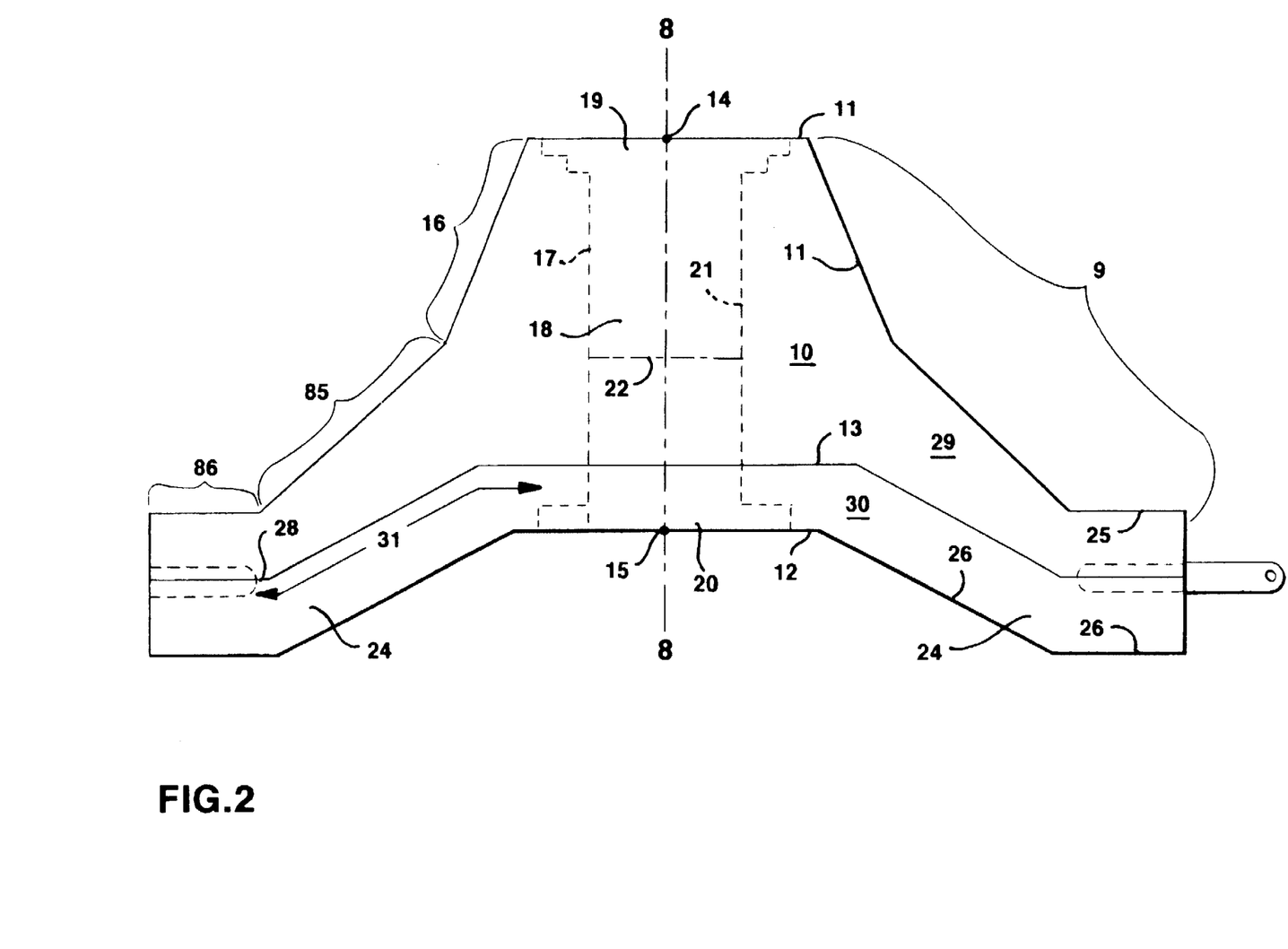
FIG. 2 is an axial cross sectional view of the rotor disc control plate.

As per FIG. 2, a rotor disc control plate 9 is constructed of material having sufficient strength and having dimensions sufficient to support the mass of the helicopter, when in operation. The rotor disc control plate 9 has a body 10. The body 10 has a body upper surface 11 and a body lower surface 12. The body 10 also has a body peripheral edge 13. The body upper surface 11 and the body lower surface 12 are joined along the body peripheral edge 13.

Figures 3, 4, 5, 6, 7, 8, 9:
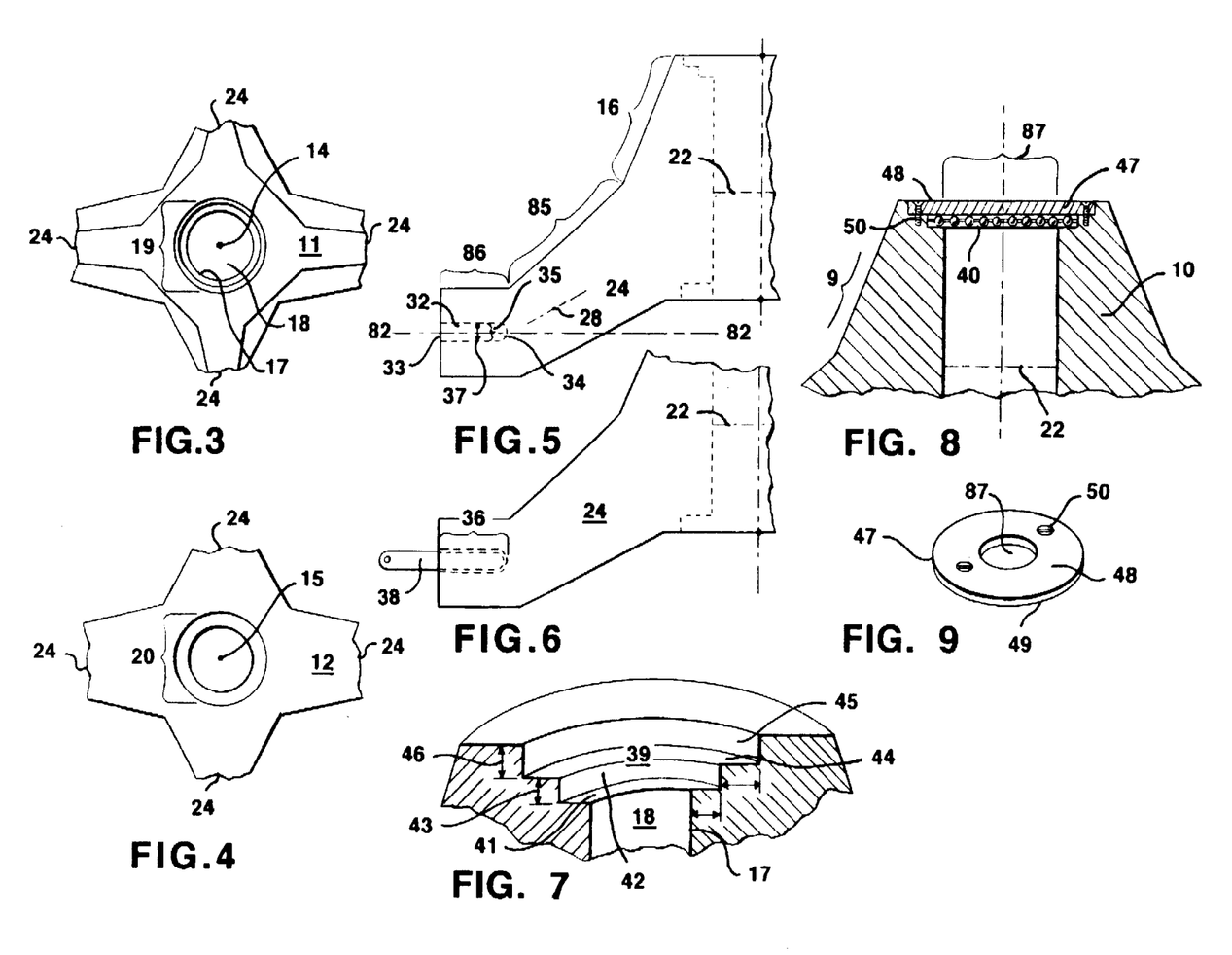
FIG. 3 is a fragmentary top view of the rotor disc control plate.
FIG. 4 is a fragmentary bottom view of the rotor disc control plate.
FIG. 5 and FIG. 6 are fragmentary axial cross sectional views of the rotor disc control plate arm.
FIG. 7 is a fragmentary cross sectional view of the rotor disc control plate neck.
FIG. 8 is a fragmentary axial cross sectional view of the rotor disc control plate neck.
FIG. 9 is a perspective view of the retaining plate.

As per FIG. 3, a first body point 14 is locatable on the body upper surface 11. The first body point 14 is locatable equidistantly from the body peripheral edge 13.

As per FIG. 4, a second body point 15 is locatable on the body lower surface 12. The second body point 15 is located equidistantly from the body peripheral edge 13.

As per FIG. 2, the first vertical axis 8 is locatable as passing through the first body point 14 and the second body point 15. The body has an elongated neck 16. In the preferred embodiment, the elongated neck 16 is formed as one piece with, and of the same material as the body 10. The elongated neck 16 has a neck tube 17. The neck tube has a neck tube bore 18. The neck tube bore 18 passes through the elongated neck 16 and the body 10, coaxial with the first vertical axis 8. The neck tube has an open top end 19 locatable on the body upper surface 11 and an open bottom end 20 locatable on the body lower surface 12. The neck tube 17 has a first inner surface 21, the first inner surface 21 being coextensive with the body upper surface 11 and the body lower surface 12. The neck tube bore 18 has a neck tube bore diameter 22, the neck tube bore diameter being greater than the diameter of an upper shaft 23.

As per FIG. 2, the body 10 has at least three arms 24, the preferred embodiment having four arms. The arms 24 have a first arm portion 85 and a second arm portion 86. The first arm portion 85 extends radially outward from the body 10, and downward from the neck tube open top end, at an acute angle to the first vertical axis 8. As used here, downward means in a direction away from the neck tube open top end 19 and toward the neck tube open bottom end 20. The second arm portion 86 thence extends outward from the body, perpendicular to the first vertical axis 8. The arms are evenly spaced about the body 10. In the preferred embodiment, the arms 24 are formed as one piece with, and of the same material as the body 10. The arms 24 have an arm upper surface 25, an arm lower surface 26, and an arm peripheral edge 28. The arm peripheral edge 28 joins the arm upper surface 25 and the arm lower surface 26. An upper surface 29 is thereby defined as comprising the arm upper surface 25 and the body upper surface 11, this upper surface 29 being continuous. A lower surface 30 is also thereby defined as comprising the arm lower surface 26 and the body lower surface 12, this lower surface 30 also being continuous. A peripheral edge 31 is defined as comprising the body peripheral edge 13 and arm peripheral edge 28, the peripheral edge 31 being continuous. The precise geometric shape of the body 10, neck 16, arm 23 combination is capable of many variations provided that the rotor disc control plate 9 is constructed to have sufficient strength to support the upper shaft 23 and maintain the structural integrity of a connection between the upper shaft and a helicopter body means 69. The second arm portion 86 must also be located downward from the neck tube open bottom end 20. While four arms are utilized in the preferred embodiment, any number of arms greater than three would be sufficient, preferably symmetrically disposed.

As per FIGS. 2 and 5 through 6, the arms 24 each have an arm tube 32 located within them, in the second arm portion 86. The arm tube has an open end 33 and a closed end 34. The open end 33 may be located on the arm peripheral edge 28 The arm tube 32 has an arm tube bore 35. The arm tube bore 35 is coaxial with the second arm portion 86 in which it is located. The distance between the arm tube open end 33 and the arm tube closed end 34 is called arm tube depth 36. The arm tube bore 35 has an arm tube bore diameter 37. The arm tube bore diameter 37 is sized to allow a slide rod 38 to be closely and slidably inserted therein. The measurement of the arm tube bore diameter 37 and the arm tube depth 36 is dependent upon the diameter and depth requirements of the slide rod 38. The arm tube has a longitudinal axis 82. The arm tube longitudinal axis is one and the same with a line drawn from a center point of the arm tube bore diameter at the arm tube open end, to a center point of the arm tube bore diameter at the arm tube closed end.

As per FIGS. 3, and 7 through 8, the body 10 has a first machined area 39 locatable at the neck tube open top end 19 and coaxial with the neck tube bore 18. The first machined area 39 is the location for placement of a means for reducing friction 40. The first machined area 39 has a first shoulder 41 and a first collar 42. The first shoulder 41 has a diameter greater than the neck tube bore diameter 22 and is perpendicular to the neck tube 17. The first collar 42 is perpendicular to the first shoulder 41, and circumferentially disposed to the neck tube bore 18. The first collar 42 has sufficient height 43 to permit the placement of the means for reducing friction 40.

As per FIGS. 2, and 7 through 9, the first machined area 39 has a second shoulder 44 and a second collar 45. The second shoulder 44 is located parallel to the first shoulder 41 and perpendicular to the first collar 42. The innermost diameter of the second shoulder 44 intersects the first collar 42 at the first collar's uppermost height, forming a 90 degree angle between the first collar 42 and the second shoulder 44. The second shoulder has a diameter greater than the diameter of the first shoulder 41. The second collar 45 is perpendicular to the second shoulder, is circumferentially disposed to the neck tube bore, and has sufficient height 46 to permit the placement of a retaining plate 47 such that a retaining plate outer surface 48 is flush with the neck tube open top end 19.

As per FIGS. 8 through 9, the retaining plate 47 has the retaining plate outer surface 48 and a retaining plate inner surface 49. The retaining plate 47 is sized to be inserted into the first machined area 39. The retaining plate is placed with the retaining plate inner surface 49 directly contacting the second shoulder 44. The retaining plate 47 has a diameter sufficient to prevent the intrusion of foreign bodies between the retaining plate 47 and the second collar 45, and serves to maintain in place the means for reducing friction 40.

As per FIG. 9, the retaining plate has a hole 87 which permits the upper shaft 23 to pass through the retaining plate. In the preferred embodiment, as per FIG. 8, the retaining plate 47 is fastened to the rotor disc control plate 9 using removable fasteners 50 which extend through the retaining plate 47, outside the diameter of the means for reducing friction 40, into the rotor disc control plate 9.

Figures 10, 11, 12, 13, 14:
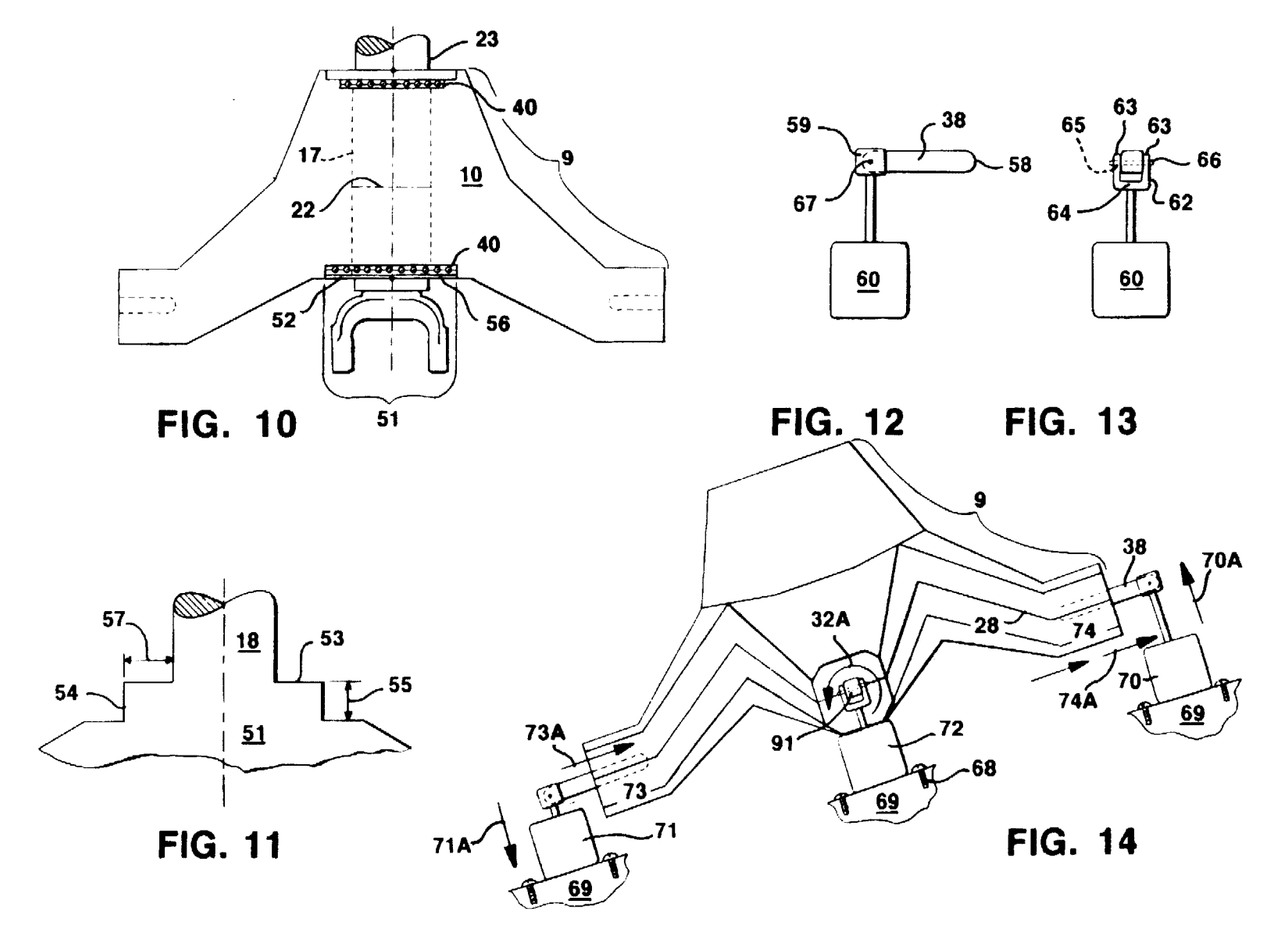
FIG. 10 is an axial partial cross sectional view of the rotor disc control plate and the upper shaft.
FIG. 11 is a fragmentary axial cross sectional view of the bottom open end of the rotor disc control plate including the second machined area.
FIG. 12 is a diagrammatic side view of the control rod and means for pushing and pulling.
FIG. 13 is a diagrammatic rear view of the control rod and means for pushing and pulling.
FIG. 14 is a side view of the rotor disc control plate cooperating with the control rods and means for pushing and pulling.

As per FIGS. 2 and 10 through 11, the body 10 has a second machined area 51 locatable at the neck tube open bottom end 20 and coaxial with the neck tube bore 18. The second machined area 51 is similar in configuration to the first machined area, and is the location for placement of the means for reducing friction 40 and an upper shaft stop plate flange 52. The second machined area has a third shoulder 53 and a third collar 54. The third shoulder 53 has a diameter 57 greater than the neck tube bore diameter 22, and is perpendicular to the neck tube. The third collar 54 is perpendicular to the third shoulder 53, and circumferentially disposed to the neck tube bore 18. The third collar 54 has sufficient height 55 to permit the placement of the means for reducing friction 40 and the upper shaft stop plate flange 52 such that an upper shaft stop plate flange outer surface 56 is flush with the neck tube open bottom end 20.

As per FIGS. 8 and 10 through 11, the means for reducing friction 40 is located in the first machined area 39 and the second machined area 51. In the preferred embodiment, the means for reducing friction 40 is a high speed bearing of the sort having an inner and an outer race, with ball bearings rotatably engaged therein. The means for reducing friction 40 is sized to fit snugly into the first machined area 39 and the second machined area 51. The means for reducing friction 40 has a hole, the hole diameter being sized smaller than the neck tube bore diameter 22, and large enough to snugly accept the upper shaft 23. When assembled, the means for reducing friction 40 is in physical contact with the upper shaft 23 and the rotor disc control plate 9. The means for reducing friction 40 located in the first machined area 39 also serves to structurally maintain the coaxial relationship of the upper shaft 23 and the rotor disc control plate neck tube bore 22.

As per FIG. 12, the slide rod 38 is tubular in shape, has a proximal end 58 and a distal end 59, the distance between the proximal end and the distal end being known as slide rod depth. The slide rod 38 is constructed of a material having physical properties sufficiently strong to withstand the forces generated when the rotor disc control plate 9 is tilted during helicopter operation. The slide rod 38 has a diameter which is sized for closely and slidably inserting into the arm tube bore 35. The materials and precise dimensions used to construct the slide rod 38 are dependent upon the model of helicopter in which the instant invention is installed.

As per FIGS. 12 through 13, the slide rod 38 is pivotally attached to a means for pushing and pulling 60. As used here, pushing is meant as extending away from the helicopter body means and pulling is meant as retracting toward the helicopter body means. In the preferred embodiment, the pivotal attachment is accomplished by having a hole with a bore 67 through a rounded distal end of the slide rod 59, and having a cradle body 62 located on the means for pushing and pulling 60, the cradle body having cradle body side walls 63 and a cradle body floor 64. The cradle body side walls 63 having a hole with a bore 65. The hole bore 65 passes through the cradle body side walls 63 at a right angle to the cradle body side walls. The distal end of the slide rod 59 is seated pivotally between the cradle body side walls 63, above the cradle body floor 64. A pin 66 passes coaxially through the cradle body side walls hole bore 65 and the slide rod hole bore 67, the pin 66 thereby maintaining the distal end of the slide rod 59 in the cradle body 62, and permitting the slide rod 38 to pivot within the cradle body 62.

As per FIG. 14, the means for pushing and pulling is attached to the helicopter body means 69. In the preferred embodiment, the means for pushing and pulling 60 is attached using removable fasteners 68 which extend through the means for pushing and pulling, into the helicopter body means 69. In the preferred embodiment, the helicopter body means 69 is the helicopter transmission casing, but any stable area (such as the helicopter main truss works) which can withstand the stresses caused by the attachment will do equally well.

As per FIG. 14, tilting of the rotor disc control plate 9 is accomplished when one means for pushing and pulling extends and another means for pushing and pulling retracts. The preferred embodiment utilizes bi-directional linear hydraulic actuators capable of extending and retracting, as the means for pushing and pulling. In the preferred embodiment, one bi-directional linear hydraulic actuator extends, and the diametrically opposed bi-directional linear hydraulic actuator retracts. The slide rod 38 also functions as a pivot point for the rotor disc control plate. This function occurs when one in a pair of diametrically opposed bi-directional linear hydraulic actuators is extending 70 and the other is retracting 71, as indicated by arrow 70a and 71a, respectively. The adjacent bi-directional linear hydraulic actuators 72 which are not extending or retracting maintain the associated slide rod stationary relative to the first vertical axis and the first horizontal plane. The extending and retracting bi-directional linear hydraulic actuators cause the rotor disc control body to pivot on the stationary slide rods 91, the stationary slide rods 91 having the arm tube 32 rotating about them, as indicated by arrow 32a.

As per FIGS. 5 and 14, tilting of the rotor disc control plate is further assisted by the slide rod being movable slidably, within the arm tube. When the means for pushing and pulling is retracting, the slide rod moves slidably 73 within the arm tube 32, toward the arm tube closed end 34, and when the means for pushing and pulling is extending, the slide rod moves slidably 74 within the arm tube 32, toward the arm tube open end 33, as indicated by arrow 73a and 74a, respectively.

Figure 15:
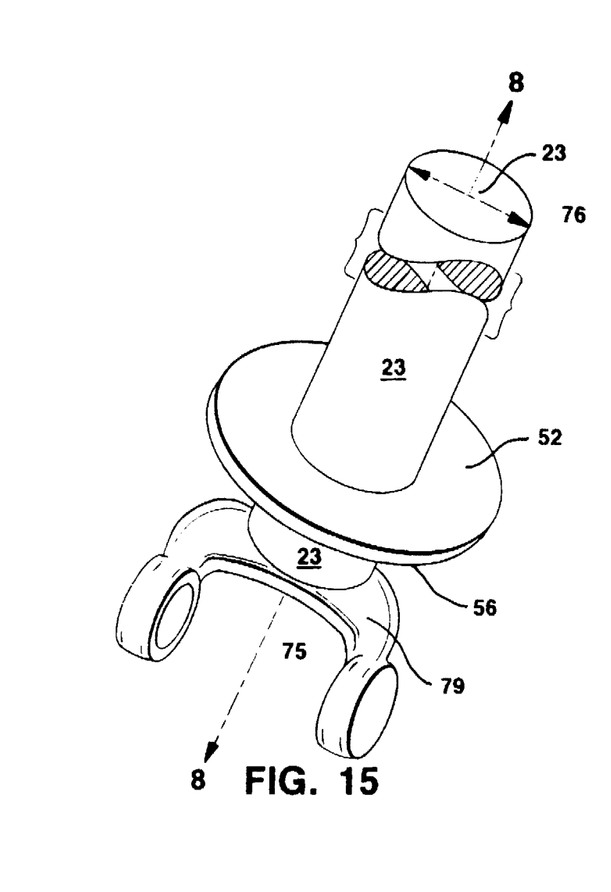
FIG. 15 is a perspective view of the upper shaft.

As per FIGS. 10 through 11 and 15, the upper shaft 23 is retained within the rotor disc control plate 9 by the upper shaft stop plate flange 52 which protrudes radially from, and circumferentially around, the upper shaft 23. The upper shaft stop plate flange is perpendicular to the first vertical axis 8. The upper shaft has a proximal end 75 and a distal end 76. The diameter of the upper shaft 23 is less than the diameter of the neck tube bore 18. The upper shaft stop plate flange 52 is located near the proximal end 75 of the upper shaft 23, the precise location being dependent upon the length of the upper shaft as specified per specific helicopter model. This upper shaft stop plate flange 52 has a diameter greater than the neck tube bore diameter and prevents the upper shaft 23 from moving distally during helicopter operation, as well as maintaining the coaxial relationship of the upper shaft 23 and the rotor disc control plate neck tube 17. The upper shaft stop plate flange has the upper shaft stop plate flange outer surface 56 which faces away from the rotor disc control plate 9 when the upper shaft is placed through the rotor disc control plate. The upper shaft stop plate flange 52 must be constructed of a material and be of sufficient dimensions to support the mass of the helicopter when in operation. In the preferred embodiment, the upper shaft stop plate flange 52 is fabricated integrally with the upper shaft 23. The precise dimensions of the upper shaft stop plate flange are dependent upon the model of helicopter in which the instant invention is installed. However, the upper shaft stop plate flange 52 must have a diameter sufficient to prevent the intrusion of foreign material between the upper shaft stop plate flange and the second machined area third collar 54. Friction which would be caused by the contact of the upper shaft stop plate flange 52 and the rotor disc control plate 9 is reduced through the means for reducing friction 40.

Figure 17:
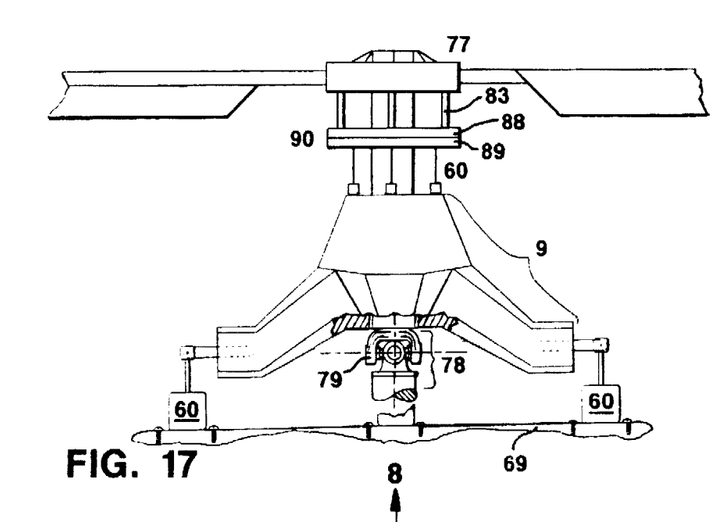
FIG. 17 is a side view of the assembled invention including the rotor disc control plate with control rods, swash plate, and means for pushing and pulling, in place, on a helicopter.

As per FIGS. 15 and 17, the upper shaft 23 is fixedly attached at the distal end 76 to the main rotor blade assembly 77. In the preferred embodiment, this main rotor blade assembly 77 is of the rigid rotor type. The upper shaft is attached at the proximal end 75 to a means for transferring the rotational motion provided by a motor and transmission, to the main rotor blades 78. In the preferred embodiment, the means for attachment 79 to the means for translating rotational motion 78 comprises a yoke 79 at the proximal end 75 of the upper shaft 23, for connection with a constant velocity joint, although a universal joint would do equally well.

Figure 16:
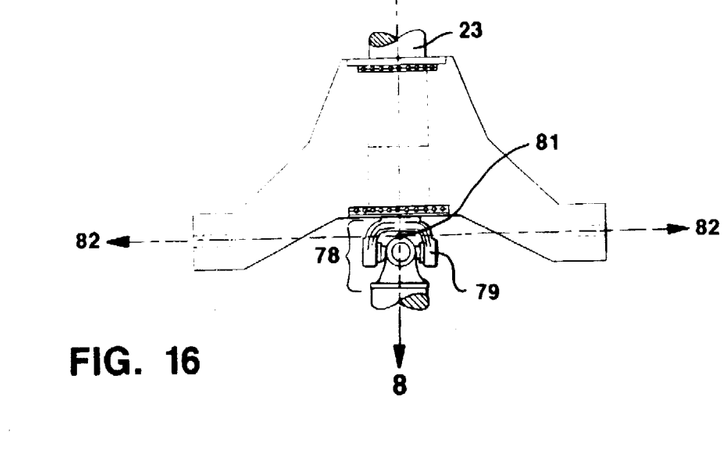
FIG. 16 is an axial partial cross sectional view of the rotor disc control plate and means for translating rotational motion to rotational motion.

As per FIGS. 1 and 16 through 17, the point at which the means for attachment 79 engages the means for translating rotational motion 78 will constitute a focal point 81. The focal point 81 is further locatable as the intersection of the longitudinal axis of the arm tubes 82, and the first vertical axis 8. This focal point 81 will be maintained at all times irrespective of the changing vertical axis 8 of the upper shaft in relation to the first horizontal plane 7. The alteration of the vertical axis of the upper shaft 23 relative to the first horizontal plane 7 creates a change in the direction of the force produced by the main rotor blade assembly 77. This change in the direction of the force produced by the main rotor blade assembly 77 results in a corresponding change of the direction in which the helicopter will move.

As per FIG. 17, the collective pitch assembly unit 82 used to control collective and feathering adjustments on a particular helicopter model is adapted to be used with the instant invention. In the preferred embodiment, this is accomplished by connecting the collective pitch assembly pitch links 83 to a first rotating ring 88 of a swashplate 90. The first rotating ring 88 is rotatably engaged with a first non-rotating ring 89 of the swashplate. The non-rotating ring 89 is connected to the rotor disc control plate 9 via the means for pushing and pulling 60.

As per FIG. 17, the fully assembled cyclic control assembly is mounted on the helicopter. During flight, the means for pushing and pulling are synchronously controlled by the pilot with the assistance of a data processing unit such as a computer. The pilot changes the helicopter's flight path by causing oppositely aligned means for pushing and pulling to either push or pull.

As per FIGS. 1, 14, and 16 through 17, when one means for pushing and pulling is actively pushing 70, and the oppositely aligned means for pushing and pulling is actively pulling 71, the arm tube longitudinal axis 82 of the rotor disc control plate 9 is changed relative to the first horizontal plane 7. The upper shaft 23 and the main rotor blade assembly 77 move in cooperation with the rotor disc control plate 9. The movement of the rotor disc control plate, mast, and the main rotor blade assembly causes an immediate redirection of the thrust being produced by the main rotor blade assembly, and does so in a manner more efficient than any of the conventional cyclic control assemblies. Furthermore, by directly altering the vertical axis 8 of the upper shaft 23 relative to the first horizontal plane 7, control of directional thrust becomes located at the rotor disc control plate 9, closer to the helicopter body means 69, thereby eliminating the controlled instability which is a by-product of the production of directional thrust in current cyclic control assemblies.

What is claimed is:

1. A helicopter cyclic control assembly comprising;
A. a rotor disc control plate, the rotor disc control plate having a body,
  I. the body having a body upper surface and a body lower surface,
  II. the body having a body peripheral edge, the body peripheral edge joining the body upper surface and the body lower surface,
  III. the body having a first vertical axis,
    a. the first vertical axis being defined as a line running through a first point located on the body upper surface, the first point being equidistant from the body peripheral edge, and a second point located on the body lower surface, the second point being equidistant from the body peripheral edge,
  IV. the body having an elongated neck,
    a. the elongated neck being coaxial with the first vertical axis,
    b. the elongated neck having a neck tube,
    c. the elongated neck tube having a bore,
      i. the neck tube bore passing through the elongated neck and the body coaxially with the first vertical axis,
      ii. the neck tube bore having an open top end and an open bottom end, the open top end being locatable on the body upper surface and the open bottom end being locatable on the body lower surface,
    d. the neck tube having a first inner surface,
      i. the first inner surface being coextensive with the body upper surface and the body lower surface,
    e. the neck tube bore having diameter,
  V. the body having at least 3 arms radially and evenly spaced about it,
    a. the arms having a first arm portion and a second arm portion,
      i. the first arm portion and the second arm portion being continuous,
      ii. the first arm portion extending outwardly from the body and downwardly, away from the neck tube bore open top end,
      iii. the second arm portion extending outwardly from the first arm portion, perpendicular to the first vertical axis,
    b. the arms having an arm upper surface, the arm upper surface being coextensive with the body upper surface,
    c. the arms having an arm lower surface, the arm lower surface being coextensive with the body lower surface,
    d. the arms having an arm peripheral edge, the arm peripheral edge being coextensive with the body peripheral edge,
    e. the arms each having an arm tube located in the second arm portion, the arm tube having an arm tube bore,
      i. the arm tube bore having an arm tube open end and an arm tube closed end,
        aa. the arm tube open end being located at the arm peripheral edge,
        bb. the arm tube closed end being at the end of the arm tube opposite the open end,
      ii. the arm tube being coaxial with the second arm portion in which the arm tube is located,
      iii. the arm tube bore having an arm tube bore diameter,
      iv. the arm tube having a longitudinal axis, the longitudinal axis being one and the same with a line drawn from a center point of the arm tube bore diameter at the arm tube open end, to a center point of the arm tube bore diameter at the arm tube closed end,
  VI. the body having a first machined area,
    a. the first machined area being located at the neck tube bore open top end, and coaxial with the neck tube bore,
    b. the first machined area having a first shoulder,
      i. the first shoulder being perpendicular to the neck tube,
      ii. the first shoulder having a diameter greater than the neck tube bore diameter,
    c. the first machined area having a first collar,
      i. the first collar being perpendicular to the first shoulder,
      ii. the first collar being circumferentially disposed to the neck tube bore,
    d. the first machined area having a second shoulder,
      i. the second shoulder being parallel to the first shoulder and perpendicular to the first collar,
      ii. the second shoulder intersecting the first collar, and forming a 90 degree angle between the first collar and the second shoulder,
      iii. the second shoulder having a diameter greater than the first shoulder,
    e. the first machined area having a second collar,
      i. the second collar being perpendicular to the second shoulder,
      ii. the second collar being circumferentially disposed to the neck tube bore,
  VII. the body having a second machined area,
    a. the second machined area being located at the neck tube bore open bottom end, and coaxial with the neck tube bore, b. the second machined area having a third shoulder,
  i. the third shoulder being perpendicular to the neck tube,
  ii. the third shoulder having a diameter greater than the neck tube bore diameter.
c. the second machined area having a third collar,
  i. the third collar being perpendicular to the third shoulder,
  ii. the third collar being circumferentially disposed to the neck tube bore;
B. a means for reducing friction,
  I. the means for reducing friction being sized to fit snugly into the first machined area,
  II. the means for reducing friction be sized to fit snugly into the second machined area,
  III. the means for reducing friction having a hole, the diameter of the hole being less than the diameter of the neck tube, and being sufficiently large to snugly accept the upper shaft;
C. a retaining plate for retaining in place the means for reducing friction,
  I. the retaining plate being sized to fit snugly into the first machined area,
  II. the retaining plate having a hole, the diameter of the hole being the same as the diameter of the neck tube,
  III. the retaining plate having a means for fastening to the rotor disc control plate,
  IV. the retaining plate having a retaining plate inner surface and a retaining plate outer surface;
D. at least 3 slide rods,
  I. the slide rods having a proximal end and a distal end,
  II. the slide rods having a diameter sized for closely and slidably inserting into the arm tube bore,
  III. the distal end of the slide rods having a means for pivotal attachment to a means for pushing and pulling, the means for pushing and pulling being fastened to a helicopter body means;
E. an upper shaft,
  I. the upper shaft having length and diameter,
    a. the diameter of the shaft being less than the diameter of the neck tube bore,
  II. the upper shaft having a distal end for attachment to a helicopter rotor blade assembly,
  III. the upper shaft having a proximal end,
  IV. the upper shaft having a means for attachment to a means for translating rotational motion to rotational motion, the means for attachment being located at the proximal end,
  V. the upper shaft having a stop plate flange,
    a. the stop plate flange extending radially and circumferentially from the upper shaft, perpendicular to the first vertical axis,
    b. the stop plate flange having an inner surface and an outer surface, and a diameter greater than the neck tube bore diameter,
    c. the stop plate flange being disposed toward the proximal end of the shaft so that when the upper shaft is rotatably engaged through the neck tube, the means for attachment to the means for translating rotational motion to rotational motion is located at a locus where the longitudinal axis of the arm tubes intersect the first vertical axis,
    d. the diameter of the stop plate flange being less than the diameter of the second machined area, and greater than the neck tube diameter.

2. A method for redirecting thrust comprising:
A. tilting a helicopter upper shaft relative to a stable body means, thereby altering a first vertical axis, the first vertical axis being defined as the vertical, longitudinal axis of the helicopter upper shaft, the upper shaft being attached at a distal end to a helicopter rotor blade assembly, and at a proximal end to a means for translating rotational motion produced by a motor and transmission to rotational motion of the helicopter rotor blade assembly, the altering of the vertical axis relative to the stable body means producing an acute angle between the first vertical axis and a horizontal plane defined by a line running through a point at the nose of the helicopter and a point at the tail of the helicopter, and a line running through a point at the port side of the helicopter and a point on the starboard side of the helicopter, the altering of the first vertical axis relative to the horizontal plane redirecting the thrust created by the helicopter rotor blade assembly;
B. maintaining a focal point irrespective of the tilting of the upper rotor shaft,
  I. the focal point being locatable at an intersection of the means for attachment to the means for translating rotational motion to rotational motion and the means for translating rotational motion to rotational motion.

3. A method for redirecting helicopter rotor thrust comprising:
A. maintaining a helicopter body means stable relative to a horizontal plane defined by line running through a point at a nose of a helicopter and a point at a tail of the helicopter, and a line running through a point at a port side of the helicopter and a point on a starboard side of the helicopter;
B. locating a means for translating rotational motion to rotational motion between a a proximal end of a helicopter upper rotor shaft, and a means for providing rotational motion,
  I. the helicopter rotor shaft having at a distal end a rotor, the rotor having rotor blades;
C. tilting the helicopter upper rotor shaft relative to the horizontal plane,
  I. the tilting of the upper rotor shaft relative to the horizontal plane redirecting thrust produced by the rotor blades;
  II. the means for translating rotational motion to rotational motion permitting the helicopter upper shaft to tilt, while the helicopter body means remains stable relative to the horizontal plane;
D. maintaining a focal point irrespective of the tilting of the upper rotor shaft,
  I. the focal point being locatable at an intersection of the means for attachment to the means for translating rotational motion to rotational motion and the means for translating rotational motion to rotational motion.

* * * * *